(12) United States Patent
Ditzler

(10) Patent No.: US 11,235,863 B2
(45) Date of Patent: Feb. 1, 2022

(54) SHOCK STRUT SHRINKING SYSTEM

(71) Applicant: GOODRICH CORPORATION, Charlotte, NC (US)

(72) Inventor: Adam J. Ditzler, Fort Worth, TX (US)

(73) Assignee: Goodrich Corporation, Charlotte, NC (US)

( * ) Notice: Subject to any disclaimer, the term of this patent is extended or adjusted under 35 U.S.C. 154(b) by 202 days.

(21) Appl. No.: 16/533,626

(22) Filed: Aug. 6, 2019

(65) Prior Publication Data
US 2021/0039772 A1 Feb. 11, 2021

(51) Int. Cl.
*B64C 25/00* (2006.01)
*B64C 25/10* (2006.01)
*B64C 25/58* (2006.01)

(52) U.S. Cl.
CPC ............ *B64C 25/001* (2013.01); *B64C 25/10* (2013.01); *B64C 25/58* (2013.01); *B64C 2025/008* (2013.01)

(58) Field of Classification Search
CPC ....... B64C 25/001; B64C 25/10; B64C 25/58; B64C 2025/008
See application file for complete search history.

(56) References Cited

U.S. PATENT DOCUMENTS

| | | | |
|---|---|---|---|
| 2,418,794 A | 4/1947 | Severson | |
| 3,086,733 A | 4/1963 | Hartel | |
| 4,047,681 A * | 9/1977 | Hartel | B64C 25/12 244/102 SS |
| 8,070,095 B2 * | 12/2011 | Luce | B64C 25/14 244/102 SS |
| 2008/0272234 A1 | 11/2008 | Thulbon | |
| 2012/0132742 A1 | 5/2012 | O'Connell | |
| 2015/0101480 A1 * | 4/2015 | Luce | F16F 9/56 92/61 |
| 2017/0016502 A1 * | 1/2017 | Simonneaux | F16F 9/366 |
| 2019/0039723 A1 | 2/2019 | Dubrovsky et al. | |
| 2020/0377201 A1 * | 12/2020 | Ditzler | B64C 25/001 |

FOREIGN PATENT DOCUMENTS

EP 2179921 4/2010

OTHER PUBLICATIONS

European Patent Office, European Search Report dated Jul. 2, 2020 in Application No. 19215235.3.

* cited by examiner

*Primary Examiner* — Rodney A Bonnette
(74) *Attorney, Agent, or Firm* — Snell & Wilmer L.L.P.

(57) ABSTRACT

A system for shrinking landing gear includes a shock strut having a cylinder and a piston to be received by the cylinder. The system further includes a collar coupled to a brace linkage and the piston, a torque arm configured to resist rotation between the collar and the piston, and a shrink linkage coupled between the torque arm and the cylinder. The collar rotates relative to the cylinder in response to retraction of the landing gear. Rotation of the collar rotates the piston and the torque arm relative to the cylinder. The rotation of the collar relative to the cylinder forces, via the shrink linkage, the piston towards the aircraft attachment within the cylinder.

20 Claims, 4 Drawing Sheets

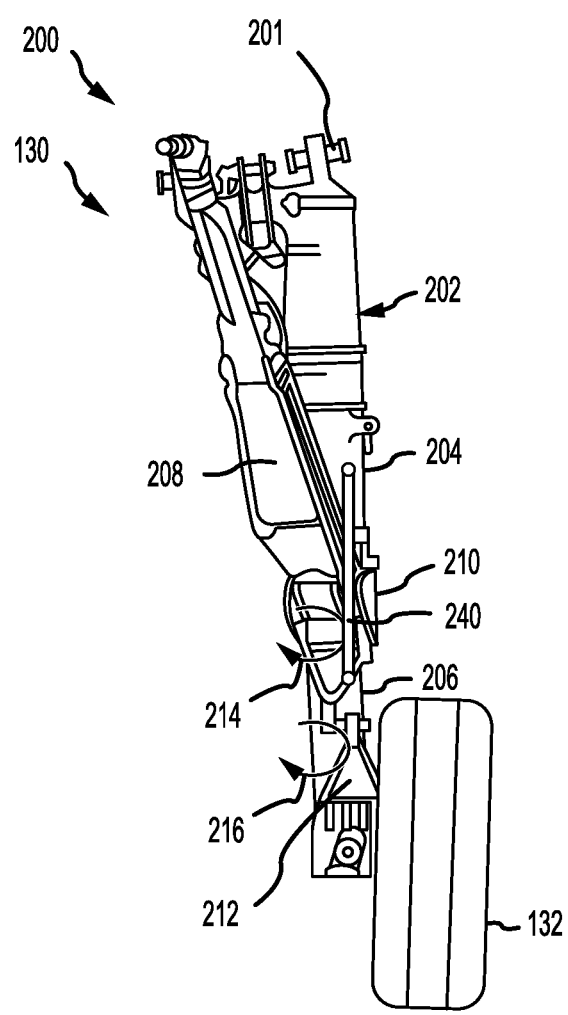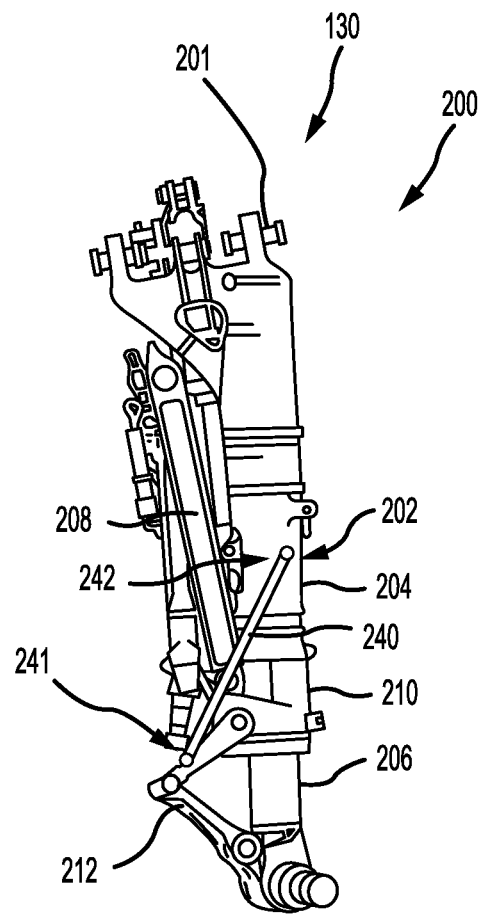
FIG.2A                    FIG.2B

SHOCK STRUT SHRINKING SYSTEM

FIELD

The present disclosure relates to landing gear of aircraft and, more particularly, to a system for shrinking landing gear.

BACKGROUND

Many aircraft include landing gear having wheel assemblies to allow the aircraft to travel along the ground during taxi, takeoff, and landing. It may be desirable to reduce a storage space of landing gear within the aircraft in response to the landing gear being stowed in the aircraft. In particular, it may be desirable to reduce a length of the landing gear when the landing gear is stowed, such reduction in length being referred to as shrinking. A significant portion of the length of the landing gear may correspond to a shock strut, which includes a cylinder and a piston. Thus, it is desirable to reduce a length of a shock strut of landing gear when stowed.

SUMMARY

Disclosed herein is a system for use with a shock strut having a cylinder, a piston, a collar, and a torque arm coupled between the piston and the collar, wherein the piston, the torque arm, and the collar rotate together about a longitudinal axis of the shock strut with respect to the cylinder. The system comprises a shrink linkage having a first end and a second end, the first end is configured to be pivotally coupled to the torque arm and the second end is configured to be pivotally coupled to the cylinder, wherein the shrink linkage is configured to force the piston into the cylinder in response to the collar rotating with respect to the cylinder.

In various embodiments, the shrink linkage is pivotally coupled to an outer diameter surface of the cylinder.

In various embodiments, the shrink linkage mechanically converts rotation of the collar into inward telescoping of the piston to shorten the shock strut.

In various embodiments, a tensile force is transmitted through the shrink linkage between the torque arms and the cylinder, causing the piston to compress into the cylinder, in response to rotation of the collar relative to the cylinder.

Also disclosed herein is a system for use with landing gear having an aircraft attachment. The system comprises a shock strut having a cylinder and a piston configured to be at least partially received by the cylinder, a brace linkage configured to be coupled to the shock strut in order to lock the landing gear in a deployed position, and to fold towards the shock strut during retraction of the landing gear, a collar coupled to the brace linkage and the piston, a torque arm configured to resist rotation between the collar and the piston, and a shrink linkage coupled between the torque arm and the cylinder. The collar is configured to rotate relative to the cylinder in response to folding of the brace linkage such that rotation of the collar rotates the piston and the torque arm relative to the cylinder, the rotation of the collar relative to the cylinder forces, via the shrink linkage, the piston towards the aircraft attachment within the cylinder.

In various embodiments, the collar is coupled to the piston via the torque arm.

In various embodiments, the system further comprises an upper bearing and a lower bearing each located radially between the piston and the cylinder.

In various embodiments, the torque arm is configured to resist rotation between the collar and the piston in response to the landing gear being extended.

In various embodiments, the system is configured for use in at least one of a main landing gear, a tail landing gear, or a nose landing gear.

In various embodiments, the shrink linkage is pivotally coupled to an outer diameter surface of the cylinder.

In various embodiments, the shrink linkage mechanically converts rotation of the collar into inward telescoping of the piston to shorten the shock strut during retraction of the landing gear.

In various embodiments, a tensile force is transmitted through the shrink linkage between the torque arms and the cylinder, causing the piston to compress into the cylinder, in response to the rotation of the collar relative to the cylinder.

Also disclosed herein is an aircraft comprising a landing gear having an aircraft attachment for pivotally coupling the landing gear to the aircraft. The landing gear comprises a shock strut having a cylinder and a piston configured to be at least partially received by the cylinder, a brace linkage configured to be coupled to the shock strut in order to lock the landing gear in a deployed position, and to fold towards the shock strut during retraction of the landing gear, a collar coupled to the brace linkage and the piston, a torque arm configured to resist rotation between the collar and the piston, and a shrink linkage coupled between the torque arm and the cylinder. The collar is configured to rotate relative to the cylinder in response to folding of the brace linkage such that rotation of the collar rotates the piston and the torque arm relative to the cylinder, the rotation of the collar relative to the cylinder forcing the piston towards the aircraft attachment within the cylinder.

In various embodiments, the collar is coupled to the piston via the torque arm.

In various embodiments, the landing gear further comprises an upper bearing and a lower bearing each located radially between the piston and the cylinder.

In various embodiments, the torque arm is configured to resist rotation between the collar and the piston in response to the landing gear being extended.

In various embodiments, the landing gear is configured for use in at least one of a main landing gear, a tail landing gear, or a nose landing gear.

In various embodiments, the shrink linkage is pivotally coupled to an outer diameter surface of the cylinder.

In various embodiments, the shrink linkage mechanically converts rotation of the collar into inward telescoping of the piston to shorten the shock strut during retraction of the landing gear.

In various embodiments, a tensile force is transmitted through the shrink linkage between the torque arms and the cylinder, causing the piston to compress into the cylinder, in response to the rotation of the collar relative to the cylinder.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 2A illustrates a deployed landing gear that includes a system for shrinking the landing gear, in accordance with various embodiments;

FIG. 2B illustrates the landing gear of FIG. 2A in a retracted position, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
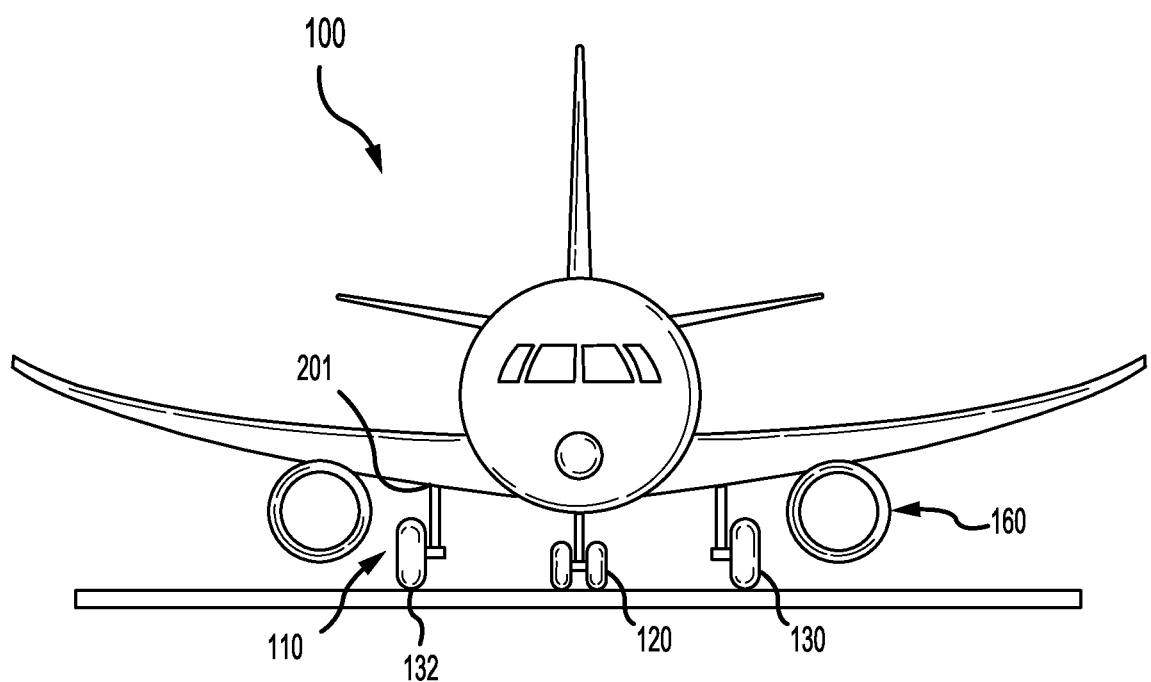
FIG. 1 illustrates an aircraft having multiple landing gear, in accordance with various embodiments.

Referring now to FIG. 1, an aircraft 100 in accordance with various embodiments can include multiple landing gear including a first landing gear 110, a second landing gear 120, and a third landing gear 130. In various embodiments, the first landing gear 110 and the third landing gear 130 may be main landing gear and the second landing gear 120 may be a nose landing gear. Each landing gear may include one or more wheel assemblies. For example, the first landing gear 110 includes a wheel assembly 132. The landing gear 110, 120, 130 and the wheel assembly 132 support the aircraft 100 in response to the aircraft 100 being parked and during taxi, takeoff, and landing of the aircraft 100.

The aircraft 100 may further include one or more gas turbine engine 160. The gas turbine engine 160 may be controlled by a pilot (such as by controlling a throttle in a cockpit) to generate thrust to accelerate the aircraft 100.

Referring now to FIGS. 2A and 2B, the landing gear 130 may include a system 200 for shrinking the landing gear 130. Referring briefly to FIGS. 1, 2A, and 2B, the landing gear 130 may be coupled to the aircraft 100 via an aircraft attachment 201. Although the system 200 is shown included in the third landing gear 130, a similar system may also or instead be included in one or more of the first landing gear 110 or the second landing gear 120. FIG. 2A illustrates the landing gear 130 in a deployed, or extended, position with the wheel and tire attached thereto with a viewpoint looking aft relative to the aircraft 100 and FIG. 2B illustrates the landing gear 130 in a retracted, or stowed, position with the wheel and tire removed in the drawing for clarity with a viewpoint looking down relative to the aircraft 100.

With reference to FIGS. 2A and 2B, the system 200 includes a shock strut 202 that is designed to absorb a shock experienced by the wheel assembly 132, such as in response to the wheel assembly 132 rolling over a rough runway or in response to a landing event. The shock strut 202 includes a cylinder 204 and a piston 206 designed to at least partially be received by the cylinder 204. In that regard, the piston 206 may translate within and relative to the cylinder 204. Furthermore, the piston 206 may rotate about its longitudinal axis with respect to the cylinder 204. The shock strut 202 may further include a mechanism, such as oil, designed to absorb the shock as the piston 206 translates into the cylinder 204.

The system 200 may further include a brace linkage 208 which may include one or more brace link. The brace linkage 208 may be coupled to a lower portion of the shock strut 202 (e.g., a location of the shock strut 202 that is located distal to the aircraft 100 of FIG. 1) and to a portion of an airframe of the aircraft 100 of FIG. 1. The brace linkage 208 may lock the landing gear 130 in a deployed position until a landing gear retraction is commanded.

The system 200 may also include a collar 210. The collar 210 may be concentric with the piston 206. The collar 210 may be coupled to the brace linkage 208 and to the piston 206, and may facilitate folding of the brace linkage 208, as discussed further below.

The system 200 may also include a set of torque arms 212. The torque arms 212 may be coupled to the piston 206 and the collar 210 and may resist rotation of the piston 206 relative to the collar 210 in response to the landing gear 130 being in the deployed position. The torque arms 212, piston 206, and collar 210 may rotate freely with respect to cylinder 204.

Figure 3:
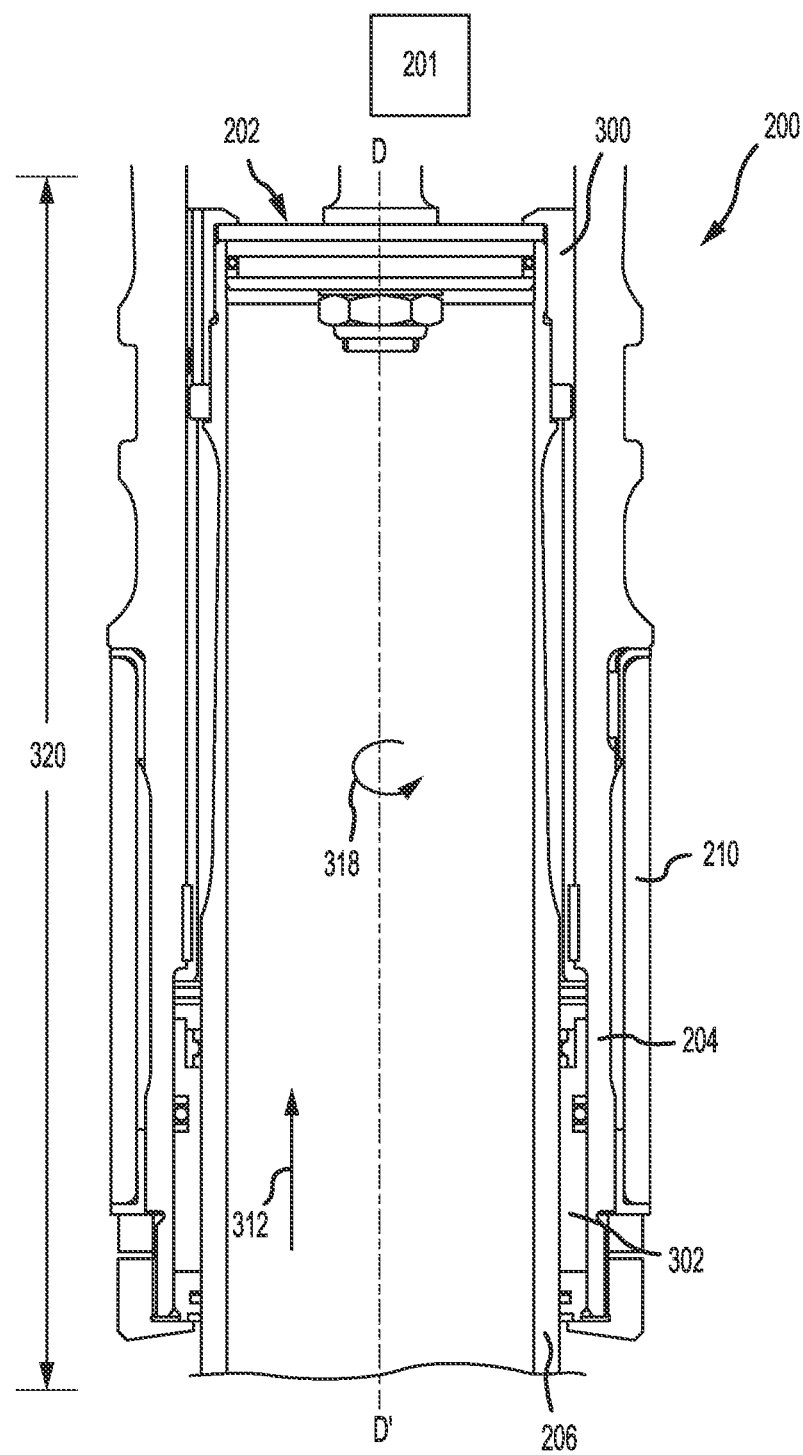
FIG. 3 illustrates an enlarged view of a portion of the landing gear of FIG. 2A including features of the system of FIG. 2A, in accordance with various embodiments.

Referring to FIGS. 2A, 2B, and 3, the system 200 may further include an upper bearing 300 and a lower bearing 302. The upper bearing 300 and the lower bearing 302 may each be located radially between the piston 206 and the cylinder 204 and may reduce friction during rotation or lateral translation of the piston 206 relative to the cylinder 204. The upper bearing 300 may be located on an upper portion of the piston 206 and the lower bearing 302 may be located on a lower portion of the shock strut 202. That is, the upper bearing 300 may be located closer to the aircraft attachment 201 than the lower bearing 302 in response to deployment of the landing gear 130. The upper bearing 300 and lower bearing 302 may be configured to accommodate rotation of piston 206 with respect to cylinder 204.

It is desirable to increase storage space in the aircraft 100. Such storage space may be used to store extra fuel, equipment, or features. In that regard, it is desirable to decrease storage space of the landing gear 130 in the aircraft 100. The features of the system 200 facilitate shrinking of the landing gear 130 by translating the piston 206 and the wheel assembly 132 (and any corresponding tire) towards the aircraft attachment 201 within the cylinder 204.

During stowing of the landing gear 130, an actuator actuates, or folds, the brace linkage 208 towards the shock strut 202. This folding action of the brace linkage 208 "unlocks" the landing gear 130, allowing it to be stowed. This folding action results in rotation of the collar 210 (as shown by an arrow 214) due to the coupling of the brace linkage 208 to the collar 210. That is, the brace linkage 208 pulls the collar 210, causing the collar 210 to rotate as the landing gear 130 begins to retract. Because the piston 206 is coupled to the collar 210 via the torque arms 212, rotation of the collar 210 causes rotation of the piston 206 (as shown by an arrow 216). In various embodiments, a degree of rotation of the piston 206 during retraction is equal to a degree of rotation of the collar 210. For example, the piston 206 and the collar 210 may each rotate during a full retraction between 50 degrees) (50°) and 150°, between 60° and 110°, or between 70° and 100°, although one skilled in the art will realize that the piston 206 and the collar 210 may rotate any amount so long as the shrink linkage 240 can accommodate such rotation.

The system 200 may also include a linkage 240 (also referred to herein as a shrink linkage) coupled between the cylinder 204 and the torque arms 212. Linkage 240 may be pivotally coupled to cylinder 204 at one end thereof and pivotally coupled to torque arms 212 at an opposite end thereof. That is, linkage 240 may have a first end 241 pivotally coupled to torque arms 212 and a second end 242 pivotally coupled to the cylinder 204. Linkage 240 may be pivotally coupled to torque arms 212 and cylinder 204 via any suitable joint which allows multi-dimensional rotation of linkage 240 with respect to the torque arms 212 and/or cylinder 204 to accommodate for translation of piston 206 with respect to cylinder 204, as well as rotation of piston 206 with respect to cylinder 204. For example, linkage 240 may be pivotally coupled to torque arms 212 and/or cylinder 204 via a plurality of pins, or a ball-and-socket joint, among other types of joints. Linkage 240 may be coupled to an outer diameter surface of cylinder 204. Linkage 240 may convert rotation of collar 210, piston 206, and torque arms 212 with respect to cylinder 204, into a force, bearing on the torque arms 212 in a manner that telescopically compresses piston 206 into cylinder 204. This telescopic compression is effected against a counteracting spring force associated with the shock strut 202 tending to urge piston 206 to a position of maximum or near maximum extension. In various embodiments, the spring force is provided by an internal pneumatic system in which a variable volume chamber of compressible gas works together with the reciprocation of piston 206 within cylinder 204. By utilizing the rotation of collar 210 with respect to cylinder 204, along with the orientation of the attaching pins, produced by the skewed mounting of brace linkage 208, to compress (by linkage 240) the piston 206 against the pneumatic spring force, the overall length 320 of the shock strut 202 is significantly shortened during retraction, thereby reducing the overall storage length of the assembly in its retracted position.

Due to the fastening of the piston 206 to the collar 210, via torque arms 212, rotation of the piston 206 (about an axis D-D', in a direction shown by an arrow 318) results in a similar rotation of the collar 210. That is, a degree of rotation of the collar 210 may equal a degree of rotation of the piston 206. The piston 206, however, is free to rotate relative to the cylinder 204. In response to rotation of the collar 210 relative to the cylinder 204, the torque arms 212 and piston 206 rotate with respect to the cylinder 204. A tensile force may be transmitted between torque arms 212 and cylinder 204 via linkage 240, causing torque arms 212 to rotate, converting the tensile force into rotation of torque arms 212 that urges piston 206 to compress into cylinder 204. Stated differently, linkage 240 pulls piston 206 into cylinder 204 in response to collar 210 rotating with respect to the cylinder 204. This force translates the piston 206 farther into the cylinder 204 in a direction shown by an arrow 312.

This translation of the piston 206 into the cylinder 204 reduces a length 320 of the shock strut 202, thus freeing up valuable space in the aircraft 100. For example, the system 200 may reduce the length 320 of the shock strut 202 (in response to the landing gear 130 being stowed) by between 1 inch and 10 inches (25.4 millimeters (mm) and 254 mm), between 1 inch and 7 inches (25.4 mm and 177.8 mm), or between 2 inches and 4 inches (50.8 mm and 101.6 mm).

In various embodiments, the freedom of movement of linkage 240, for converting the rotation of collar 210 with respect to cylinder 204 into the force applied to torque arms 212, may be provided by pivoting joints disposed at each end of linkage 240. In various embodiments, linkage 240 may be coupled to cylinder 204 via a swivel joint, such as a ball and socket swivel, or the like. In various embodiments, linkage 240 may be coupled to torque arms 212 via a swivel joint, such as a ball and socket swivel, or the like. In this manner, linkage 240 is free to move with respect to cylinder 204 and/or torque arms 212 in response to both translation of piston 206 with respect to cylinder 204 as well as rotation of piston 206 about its longitudinal axis with respect to cylinder 204. In various embodiments, the linkage 240 is made from a metal, a fiber-reinforced composite, or any other suitable material capable of withstanding tensile loads applied thereto during retraction, as well as the environmental conditions of landing gear 130.

In various embodiments, linkage 240 may comprise a variable length, in which it is freely extendable and collapsible, allowing piston 206 freedom to reciprocate in cylinder 204 as necessary to absorb the forces associated with landing and ground taxiing. For example, linkage 240 may comprise two rods which telescopically move with respect to each other to allow linkage 240 to vary in length during landing and ground taxiing. In various embodiments, linkage 240 may comprise a maximum length which prevents linkage 240 from further extension in response to collar 210 rotating with respect to cylinder 204 during retraction of landing gear 130. For example, a stop may be provided which prevents the two rods from extending past a maximum length. In this manner, linkage 240 allows piston 206 freedom to reciprocate in cylinder 204 during landing and ground taxiing, but forces piston 206 into cylinder 204 during retraction, shrinking the total length of landing gear 130. For example, the rotation of collar 210 with respect to cylinder 204 may cause the linkage 240 to extend to its maximum length, at which point the linkage 240 transmits a force between the torque arms 212 and cylinder 204, urging the piston 206 to retract into cylinder 204. It is contemplated herein that various mechanical, pneumatic, hydraulic, and/or electric systems may be provided for actuating linkage 240 between a variable length, non-restraint mode during landing and ground taxiing, and a force transmitting, shrinking mode during retraction of the landing gear 130.

In various embodiments, first end 241 of linkage 240 may be attached to torque arms 212 via a lost-motion joint which allows the piston 206 and torque arms 212 to move during landing or ground taxiing without transmitting that motion of piston 206 and torque arms 212 to the linkage 240. However, during retraction the linkage 240 can engage an end stop in the lost-motion joint that allows the linkage 240 to transmit the tensile force to the torque arms 212 and translate the piston 206 into the cylinder 204.

Figures 4A, 4B:
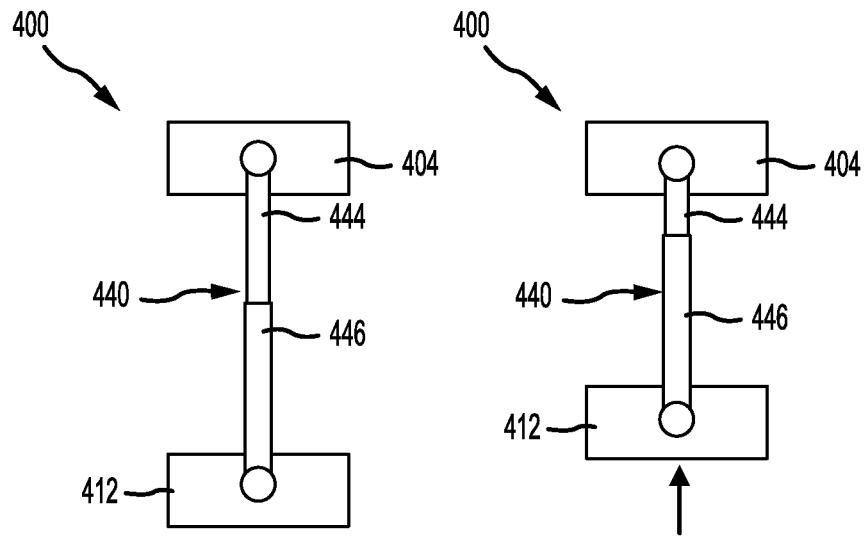
FIG. 4A and FIG. 4B illustrate a shrink linkage arrangement having a variable length linkage coupled to a shock strut in a partially extended position and a partially compressed position, respectively, in accordance with various embodiments.

With reference to FIG. 4A and FIG. 4B, a shrink linkage arrangement 400 is illustrated, in accordance with various embodiments. Shrink linkage arrangement 400 may comprise a linkage 440 coupled between a cylinder 404 and torque arms 412. Cylinder 404 and torque arms 412 may be similar to cylinder 204 and torque arms 212, respectively, of FIG. 2A and FIG. 2B. Linkage 440 may comprise two rods, such as a first rod 444 and a second rod 446, which telescopically move with respect to each other to allow linkage 440 to vary in length during landing and ground taxiing. FIG. 4B illustrates torque arms 412 moved towards cylinder 404 (e.g., in response to a piston compressing into cylinder 404) with the linkage 440 accommodating this movement.

Figures 5A, 5B:
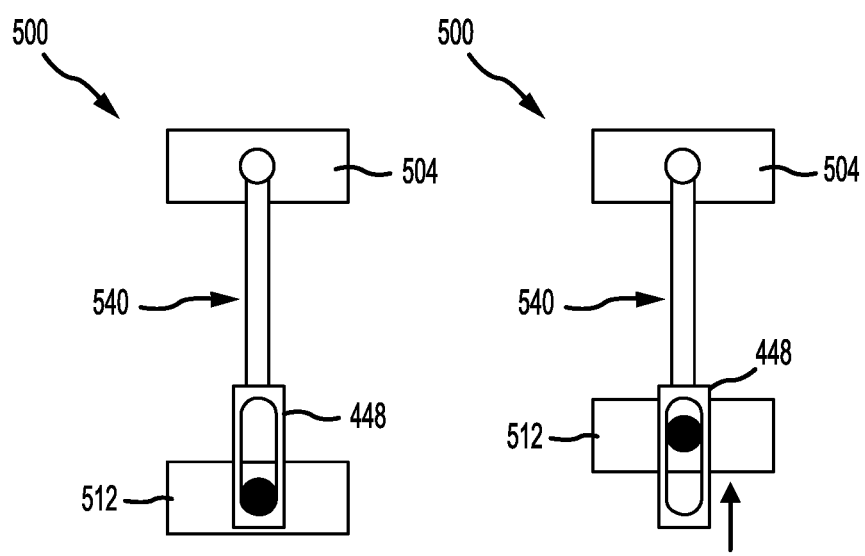
FIG. 5A and FIG. 5B illustrate a shrink linkage arrangement coupled to a shock strut component via a lost-motion joint, with the shock strut in a partially extended position and a partially compressed position, respectively, in accordance with various embodiments.

With reference to FIG. 5A and FIG. 5B, a shrink linkage arrangement 500 is illustrated, in accordance with various embodiments. Shrink linkage arrangement 500 may comprise a linkage 540 coupled between a cylinder 504 and torque arms 512. Cylinder 504 and torque arms 512 may be similar to cylinder 204 and torque arms 212, respectively, of FIG. 2A and FIG. 2B. In various embodiments, linkage 540 may be attached to torque arms 512 via a lost-motion joint 448 which allows a piston (e.g., piston 206) and torque arms 512 to move during landing or ground taxiing without transmitting that motion of the piston and torque arms 512 to the linkage 540. However, during retraction the linkage 540 can engage an end stop in the lost-motion joint 448 that allows the linkage 540 to transmit the tensile force to the torque arms 512 and translate the piston into cylinder 504.

In this regard, and with reference to FIG. 2B, linkage 240 may be constructed so that when shock strut 202 is moved to a downwardly extending position (see FIG. 2A), linkage 240 is freely extendable and collapsible so that its length is variable to permit unrestrained articulation of torque arms 212 between first and second angular configurations, and wherein linkage 240 includes components that limits variation of its length when collar 210, torque arms 212, and piston 206 are rotated during retraction of shock strut 202 (see FIG. 2B) to cause linkage 240 to assume a fixed length that is effective to transmit a force between cylinder 204 and torque arms 212 so as to displace the links of torque arms 212 toward a second angular configuration to cause inward telescoping of piston 206 against the biasing of the internal pressure (e.g., of a gas) of shock strut 202.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for use with landing gear, the system comprising:
    a shock strut having a cylinder, a piston, a collar, and a torque arm coupled between the piston and the collar, wherein the piston, the torque arm, and the collar rotate together about a longitudinal axis of the shock strut with respect to the cylinder; and
    a shrink linkage having a first end and a second end, the first end is configured to be pivotally coupled to the torque arm and the second end is configured to be pivotally coupled to the cylinder;
    wherein the shrink linkage is configured to force the piston into the cylinder in response to the collar rotating with respect to the cylinder.

2. The system of claim 1, wherein the shrink linkage is pivotally coupled to an outer diameter surface of the cylinder.

3. The system of claim 2, wherein the shrink linkage mechanically converts rotation of the collar into inward telescoping of the piston to shorten the shock strut.

4. The system of claim 2, wherein a tensile force is transmitted through the shrink linkage between the torque arms and the cylinder, causing the piston to compress into the cylinder, in response to rotation of the collar relative to the cylinder.

5. A system for use with landing gear having an aircraft attachment, the system comprising:
    a shock strut having a cylinder and a piston configured to be at least partially received by the cylinder;
    a collar configured to be rotatably mounted to the cylinder;

a brace linkage configured to be coupled to the collar in order to lock the landing gear in a deployed position, and to fold towards the shock strut during retraction of the landing gear;

a torque arm configured to resist rotation between the collar and the piston so as to cause the collar and the piston to rotate together with respect to the cylinder, wherein the torque arm extends between the collar and the piston; and a shrink linkage configured to be coupled between the torque arm and the cylinder;

wherein the collar is configured to rotate relative to the cylinder in response to folding of the brace linkage such that rotation of the collar rotates the piston and the torque arm relative to the cylinder, the rotation of the collar relative to the cylinder forces, via the shrink linkage, the piston towards the aircraft attachment within the cylinder.

6. The system of claim 5, wherein the collar is coupled to the piston via the torque arm.

7. The system of claim 6, further comprising an upper bearing and a lower bearing each located radially between the piston and the cylinder.

8. The system of claim 5, wherein the torque arm is configured to resist rotation between the collar and the piston in response to the landing gear being extended.

9. The system of claim 5, wherein the system is configured for use in at least one of a main landing gear, a tail landing gear, or a nose landing gear.

10. The system of claim 5, wherein the shrink linkage is pivotally coupled to an outer diameter surface of the cylinder.

11. The system of claim 5, wherein the shrink linkage mechanically converts rotation of the collar into inward telescoping of the piston to shorten the shock strut during retraction of the landing gear.

12. The system of claim 5, wherein a tensile force is transmitted through the shrink linkage between the torque arms and the cylinder, causing the piston to compress into the cylinder, in response to the rotation of the collar relative to the cylinder.

13. An aircraft comprising:

a landing gear having an aircraft attachment for pivotally coupling the landing gear to the aircraft, the landing gear comprising:

a shock strut having a cylinder and a piston configured to be at least partially received by the cylinder;

a collar configured to be rotatably mounted to the cylinder;

a brace linkage configured to be coupled to the collar in order to lock the landing gear in a deployed position, and to fold towards the shock strut during retraction of the landing gear;

a torque arm configured to resist rotation between the collar and the piston so as to cause the collar and the piston to rotate together with respect to the cylinder, wherein the torque arm extends between the collar and the piston; and a shrink linkage configured to be coupled between the torque arm and the cylinder;

wherein the collar is configured to rotate relative to the cylinder in response to folding of the brace linkage such that rotation of the collar rotates the piston and the torque arm relative to the cylinder, the rotation of the collar relative to the cylinder forcing the piston towards the aircraft attachment within the cylinder.

14. The aircraft of claim 13, wherein the collar is coupled to the piston via the torque arm.

15. The aircraft of claim 14, wherein the landing gear further comprises an upper bearing and a lower bearing each located radially between the piston and the cylinder.

16. The aircraft of claim 13, wherein the torque arm is configured to resist rotation between the collar and the piston in response to the landing gear being extended.

17. The aircraft of claim 13, wherein the landing gear is configured for use in at least one of a main landing gear, a tail landing gear, or a nose landing gear.

18. The aircraft of claim 13, wherein the shrink linkage is pivotally coupled to an outer diameter surface of the cylinder.

19. The aircraft of claim 13, wherein the shrink linkage mechanically converts rotation of the collar into inward telescoping of the piston to shorten the shock strut during retraction of the landing gear.

20. The aircraft of claim 13, wherein a tensile force is transmitted through the shrink linkage between the torque arms and the cylinder, causing the piston to compress into the cylinder, in response to the rotation of the collar relative to the cylinder.

* * * * *